United States Patent [19]
Hsieh

[11] Patent Number: 5,574,443
[45] Date of Patent: Nov. 12, 1996

[54] VEHICLE MONITORING APPARATUS WITH BROADLY AND RELIABLY REARWARD VIEWING

[76] Inventor: Chi-Sheng Hsieh, c/o Hung Hsing Patent Service Center P.O. Box 55-1670, Taipei, Taiwan

[21] Appl. No.: 263,715

[22] Filed: Jun. 22, 1994

[51] Int. Cl.$^6$ ........................................ H04N 7/18
[52] U.S. Cl. .................... 340/901; 340/435; 340/436; 340/903; 340/904; 348/118; 348/148
[58] Field of Search ........................... 340/435, 436, 340/437, 901, 902, 903, 904; 348/118, 148

[56] References Cited

U.S. PATENT DOCUMENTS

| | | | |
|---|---|---|---|
| 4,843,463 | 6/1989 | Michetti | 348/148 |
| 4,910,591 | 3/1990 | Petrossian et al. | 348/148 |
| 5,027,200 | 6/1991 | Petrossian et al. | 348/148 |

Primary Examiner—Brent A. Swarthout
Assistant Examiner—Edward Lefkowitz

[57] ABSTRACT

A vehicle monitoring apparatus includes a rear video camera mounted on a rear portion of a vehicle, a right video camera mounted on a right sideview mirror, a left video camera mounted on a left-sideview mirror, a mirror-effect circuit connected across two poles of a pair of horizontal deflection coils of a horizontal deflection add oscillation circuit of a television receiver electrically connected to the video cameras for inverting an image or picture orientation to be the same as an orientation of the real subject positioned at a rear side of the vehicle, whereby upon a backing, a rightward turning or a leftward turning of the vehicle a corresponding video camera will be initiated to transmit a "picture" of the subject positioned at the rear side of the vehicle to display a picture on a television placed in the vehicle having a same orientation of the picture as that of the true subject for preventing an accidental collision due to falsely backing or turning of the vehicle for driving safety.

8 Claims, 4 Drawing Sheets

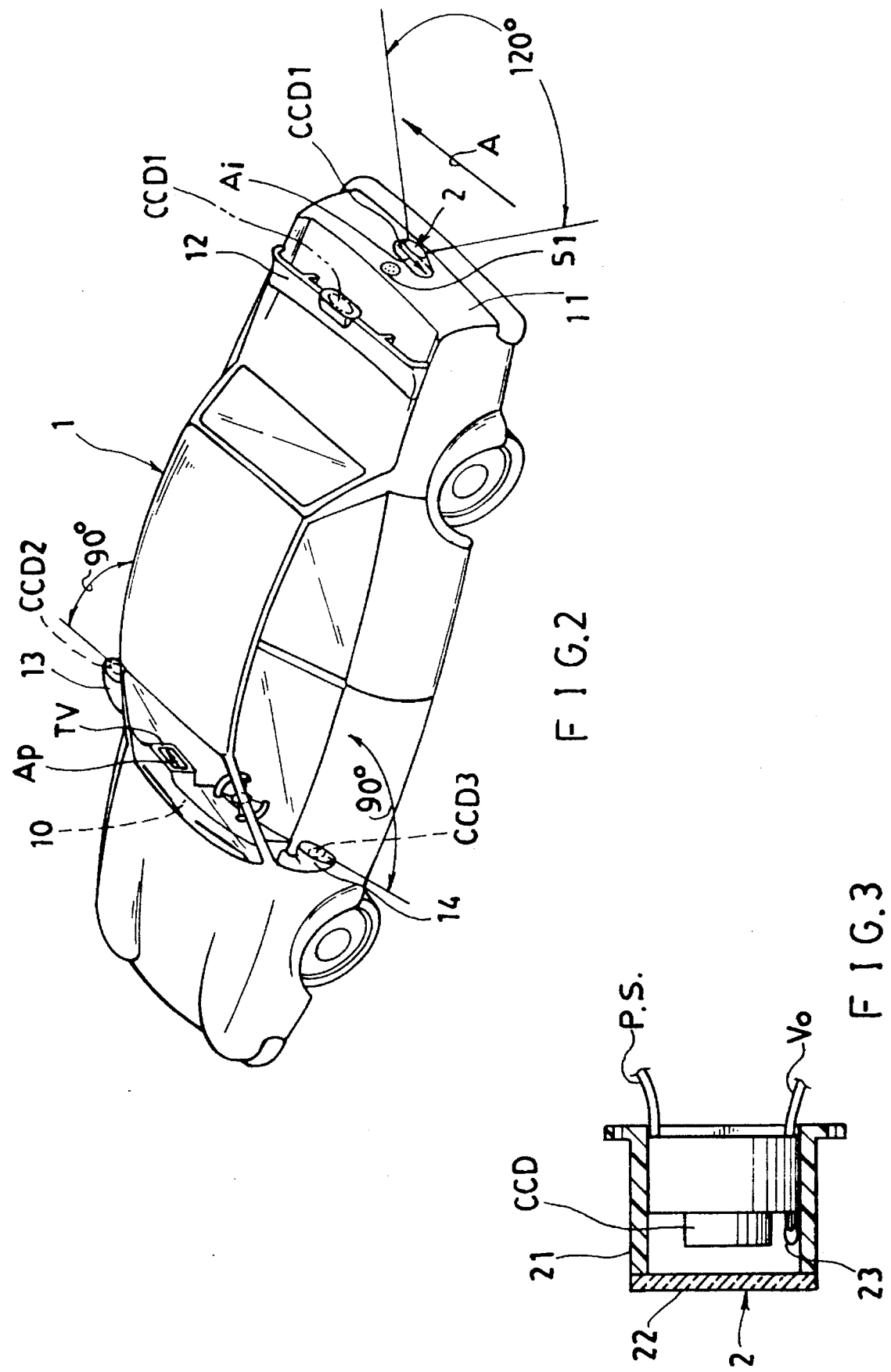

VEHICLE MONITORING APPARATUS WITH BROADLY AND RELIABLY REARWARD VIEWING

BACKGROUND OF THE INVENTION

When a car is backing rearwardly as shown in FIG. 1, a television camera C may be mounted on a rear portion of the car for sensing any object or subject O positioning at a rear side of the car for transmitting the image of the object O to be displayed on a television TV placed in a front portion of the car in order for preventing collision on the object O when backing the car.

However, an "imaginative" arrow A aiming rightwardly behind the car will be inverted for changing its orientation when focusing into the camera C through a lens L of the camera C and the image A1 of the arrow A sensed by the camera C will be changed to a leftward orientation. By a synchronous scanning and transmitting of the image A1 from the camera C to the cathode ray tube (CRT) in the television TV, a picture of the arrow A1 will be reproduced on the television to show the arrow A1 of leftward aiming which is however opposite to the real direction of the arrow A. By the way, the location or orientation of the object image Oi shown on the television TV will be opposite to that of the real object O. If the car driver wants to prevent collision on the object such as a kid, an animal or a fragile property by watching the conventional television as shown in FIG. 1, he may back his car rightwardly (R) when falsely or misleadingly "guided" by the picture Oi displayed on the television to possibly cause injury or damage to the real object O positioning at a rear right side of the car.

It is therefore invented by the present inventor to disclose a monitoring apparatus of a car for watching a television picture having its orientation as same as that of a real subject or object behind a car.

SUMMARY OF THE INVENTION

The object of the present invention is to provide a vehicle monitoring apparatus including a rear video camera mounted on a rear portion of a vehicle, a right video camera mounted on a right sideview mirror, a left video camera mounted on a left-sideview mirror, a mirror-effect circuit connected across two poles of a pair of horizontal deflection coils of a horizontal deflection and oscillation circuit of a television receiver electrically connected to the video cameras for inverting an image or picture orientation to be the same as an orientation of the real subject positioned at a rear side of the vehicle, whereby upon a backing, a rightward turning or a leftward turning of the vehicle, a corresponding video camera will be initiated to transmit a "picture" of the subject positioned at the rear side of the vehicle to display a picture on a television placed in the vehicle having a same orientation of the picture as that of the true subject for preventing an accidental collision because of falsely backing or turning of vehicle for driving safety.

BRIEF DESCRIPTION OF THE DRAWINGS

FIG. 2 is a perspective view of the present invention.

FIG. 3 is a partial sectional drawing of a video camera of the present invention.

DETAILED DESCRIPTION

Figure 1:
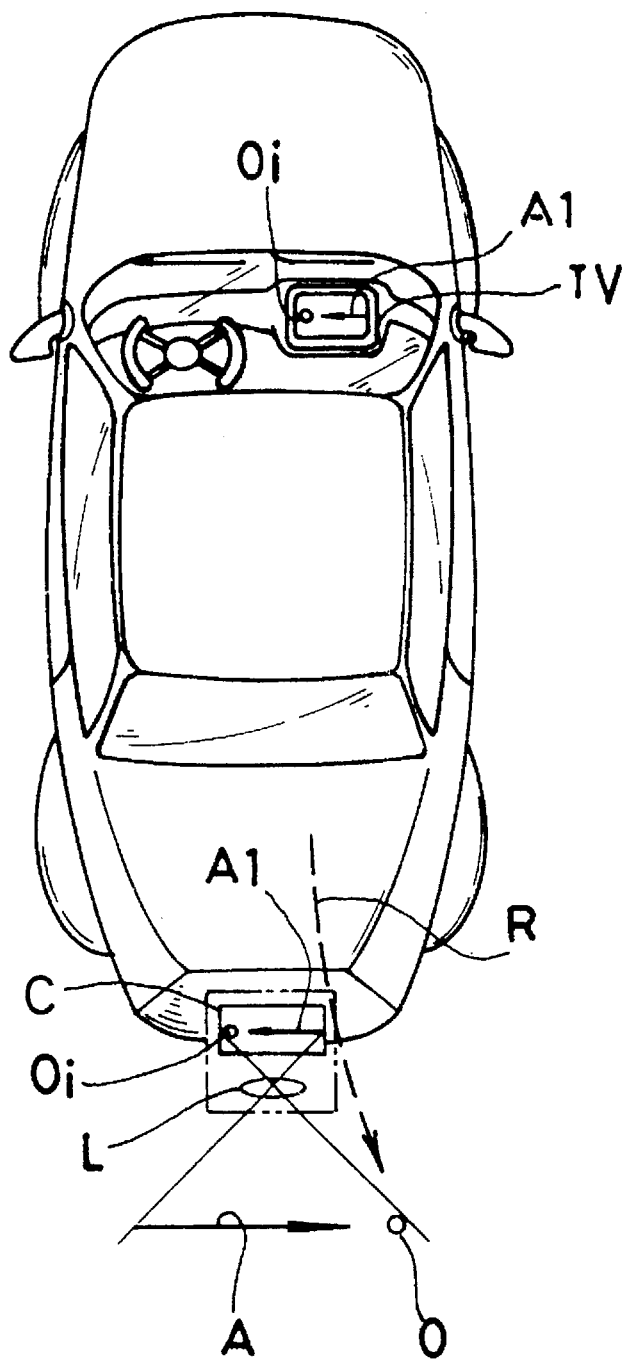
FIG. 1 is a top view illustration of a car mounted with a conventional television camera and television.

As shown in FIGS. 2–6, the present invention comprises: a car or vehicle 1; a plurality of video cameras 2 preferably made of charge coupled device (CCD) including a rear video camera CCD1 mounted on a rear portion 11 of the car 1, a right video camera CCD2 mounted in a right-sideview mirror 13 of the car 1, a left video camera CCD3 mounted in a left-sideview mirror 14 of the car 1; a television receiver 3; a mirror-effect circuit 4 connected in the television receiver 3; a sound-signal sensor 5 including a microphone 51 mounted on a rear portion of the car 1 (but not limited) for picking up sound signal from a rear side of the car 1 and connected to a sounding circuit 32 of the television receiver 3; a system control circuit 6 for automatically actuating the video cameras 2 the mirror-effect circuit 4 and the sound-signal sensor 5 connected to the television receiver 3; and a display means 7 which is substantially a television set or monitor having a cathode ray tube (CRT) therein and installed in a front portion 10 in the car 1 such as mounted on a dashboard or in the center console of the car 1 and electrically connected to a power source P.S. as on-off controlled by a display switch 71.

Figure 4:
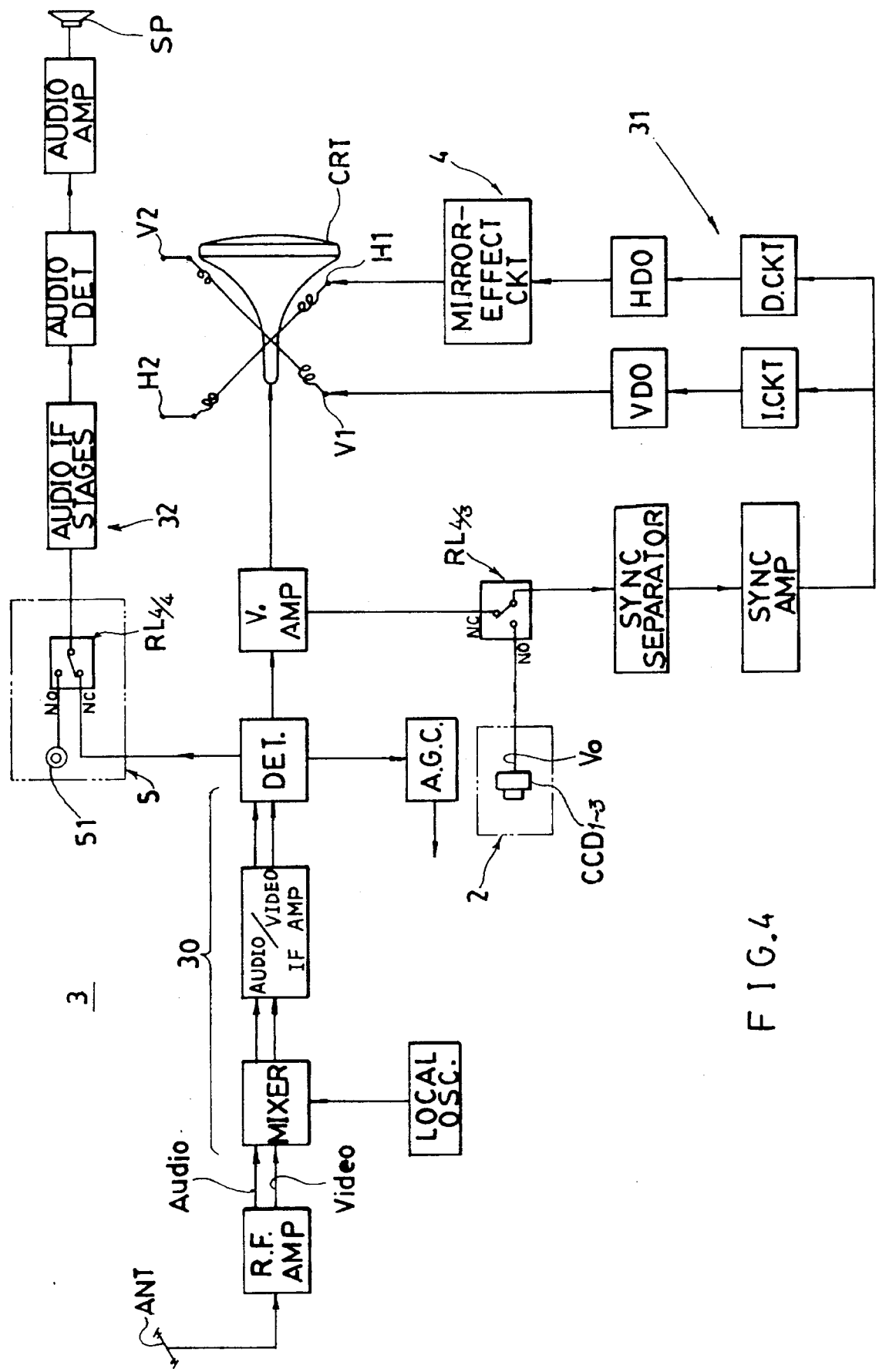
FIG. 4 is a circuit diagram of the present invention.

The television receiver 3 as shown in FIG. 4 is a conventional television-signal receiving circuit including: an audio and video receiving circuit 30 having an antenna ANT for receiving the picture and sound signals which are fed to the tuner consisting of a RF amplifier (RF AMP), a local oscillator (LOCAL OSC.), and a mixer (MIXER), an intermediate frequencies (IF) amplifier (IF AMP) for amplifying the output signals from the mixer, a detector (DET) for detecting the video signals which are amplified by the video amplifier (V. AMP) and then applied to the cathode of the picture tube (CRT), and the detector (DET) also for detecting the audio signals which are sent to the sounding circuit 32 through the sounding-circuit contactor RL4/4 of a mirror-effect relay RL4 to a loudspeaker SP through the audio intermediate frequencies stages (IF STAGES), audio detector (AUDIO DET), and audio amplifier (AUDIO AMP) as shown in FIG. 4; and a deflection circuit 31, connected to the video amplifier (V. AMP) through a deflection-circuit contactor FL4/3 of the mirror-effect relay RL4, and including a synchronous separator (SYNC SEPARATOR), synchronous amplifier (SYNC AMP), an integrating circuit (I. CKT) connected to a vertical deflection and oscillation circuit (VDO) having two poles V1, V2 of vertical deflection coils horizontally disposed on two opposite sides of the picture tube CRT, a differentiating circuit (D. CKT) connected to a horizontal deflection and oscillation circuit (HDO) having two poles H1, H2 of horizontal deflection coils Hc vertically disposed on two opposite sides of the picture tube CRT. The numeral AGC is an automatic gain control for controlling the bias of RF and IF amplifiers of the television receiver 3.

The receiver 3 is so conventional and will not be described in detail in this specification.

The rear video camera CCD1 may also be mounted on a wind deflector 12 on a rear portion of the car 1 as shown in dotted line of FIG. 2. The microphone 51 of the sound-signal sensor 5 may be mounted on a rear portion of the car 1.

The video camera 2 an shown in FIG. 3 includes: a camera of charge coupled device CCD electrically connected to a power source P.S., a housing 22 encasing the camera of charge coupled device in the housing 21, a light-transmissive shield 22 made of dark color and having a flat surface and covering an outer portion of the housing 21 allowing optical focusing of an external subject or object positioned at a rear side of the car 1 into the camera CCD for transmitting video signals Vo towards the display means 7, and an illuminator 23 mounted in the housing 21 such as an infrared illuminator for a visible sensing of the external subject at night or darkness.

The light-transmissive shield 22 made of dark color may make the camera CCD inside the housing 21 invisible from an outside watching for preventing an intentional breaking or damaging of the camera CCD by someone. Meanwhile, the shield 22 may protect the camera CCD for an easy maintenance and cleaning on the shield 22 without contacting a lens of the camera.

The mirror-effect circuit 4 includes: a mirror-effect relay RL4 including a first relay contactor RL4/1 and a second relay contactor RL4/2 reversely connected to a first and a second pole H1, H2 of the horizontal deflection coils Hc connected to a horizontal deflection and oscillation circuit HDO of the television receiver 3 to operatively change the conventional left-to-right scanning direction to a right-to-left scanning direction to thereby reverse the right-and-left picture orientation on a conventional television camera and a cathode ray tube of a left-to-right scanning to have a right-and-left orientation of a picture shown on the display means 7 to be same as that of a true subject or object positioned at a rear side of the car 1 (like a mirror producing a same-direction image of the subject) upon actuation of a third relay contactor (a deflection circuit contactor) RL4/3 of the mirror-effect relay RL4 when backing the car or turning the car rightwardly or leftwardly.

Figure 5:
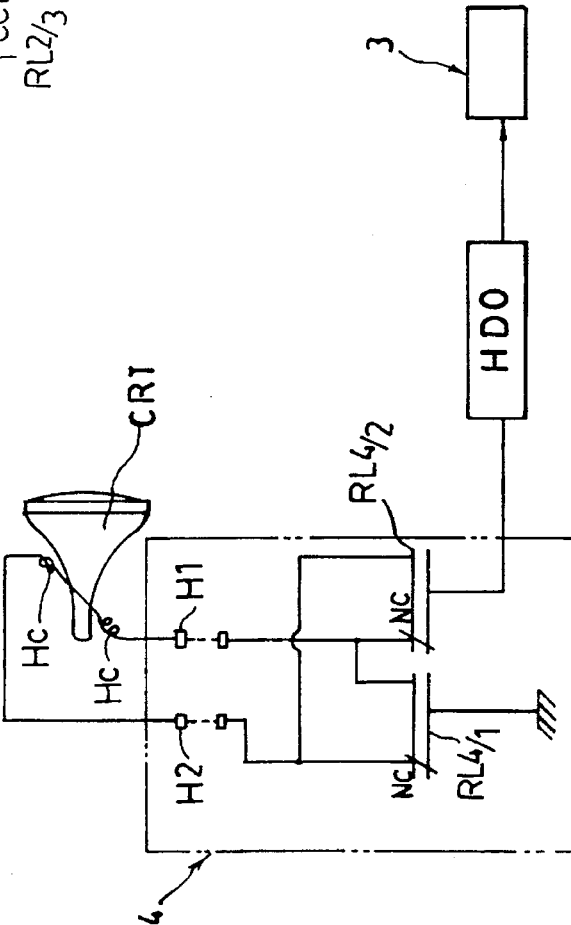
FIG. 5 shows a mirror-effect circuit of this invention.

As shown in FIG. 5, the first pole HI of the conventional horizontal deflection coils Hc is normally connected (normal close, NC) to the horizontal deflection and oscillation circuit HDO of the television receiver 3, and the second pole H2 of the horizontal deflection coils Hc is normally (NC) grounded. The first relay contactor RL4/1 of the present invention is normally connected to the first pole H1 of the horizontal deflection coils Hc and is operatively grounded, when the mirror-effect relay RL4 is actuated to close the third relay contactor RL4/3 of the mirror-effect relay RL4 such as when backing the car or turning the car rightwardly or leftwardly; while the second relay contactor RL4//2 is normally connected to the horizontal deflection and oscillation, coil HDO and is operatively connected to the second pole H2 of the horizontal deflection coils Hc when the mirror-effect relay RL4 is actuated.

The sound-signal sensor 5 includes: a microphone 51 mounted on an outer portion of the car 1 for picking up sound signals from a surrounding of the car 1 for inputing sound signals into the sounding circuit 32 of the television receiver 3 through a sounding-circuit contactor which is a fourth contactor RL4/4 of the mirror-effect relay RL4, whereby upon actuation of the mirror-effect relay RL4 to close the sounding circuit contactor RL4/4, the sound or audio signals from the television receiver 3 will be detected and amplified by the sounding circuit 32 for sounding the sound signal through the loud speaker SP.

Figure 6:
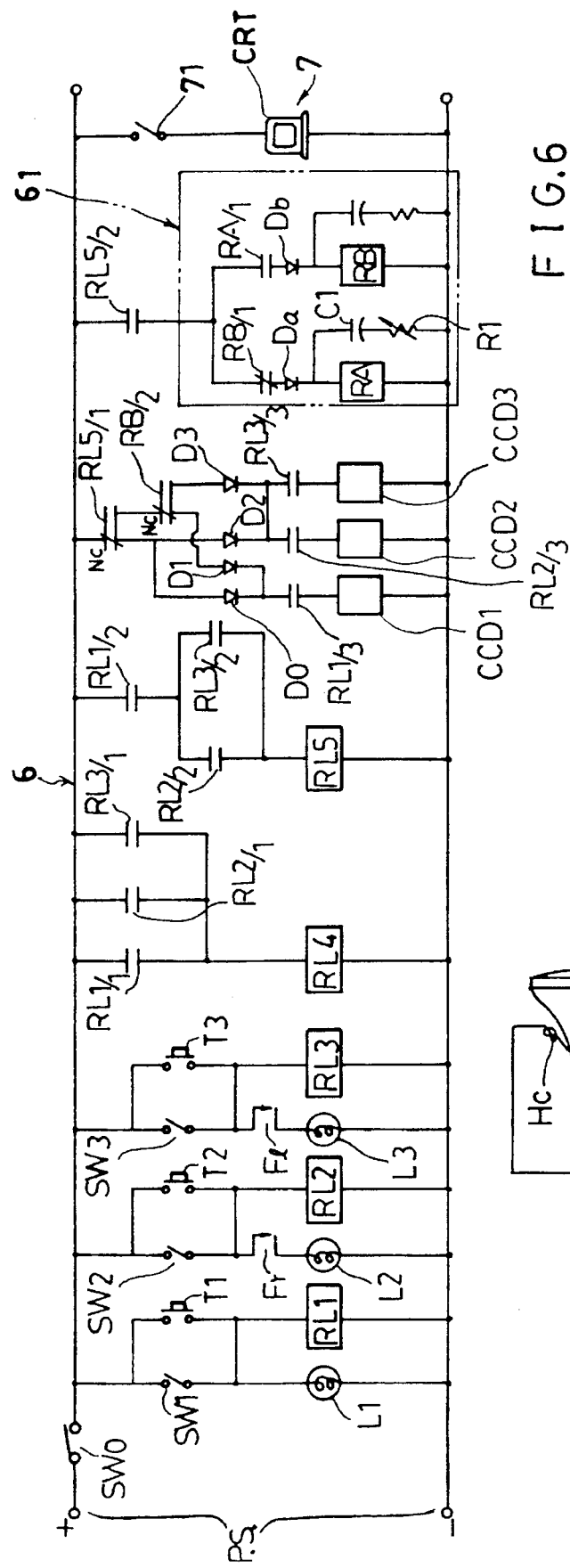
FIG. 6 shows a system control circuit of the present invention.

The system control circuit 6 as shown in FIG. 6 includes: a backing relay RL1 electrically connected in series with a car-backing switch SW1 which is actuated when backing the car and is connected in series with a car-backing lamp L1 and connected with a car key switch or main switch SWo which is connected in between two poles of the power source P.S. and will be closed such as when inserting the car key into its key hole (not shown) for powering the control circuit 6; a right-turn relay RL2 electrically connected in series with a right-turn switch SW2 which is actuated when turning the car rightwardly, with the right-turn switch SW2 connected with a right-turn lamp L2 provided with a flasher Fr for indicating the right-turning of the car; a left-turn relay RL3 electrically connected in series with a left-turn switch SW3 which is actuated when turning the car leftwardly, with the left-turn switch SW3 connected with a left-turn lamp L3 provided with a flasher F1 for indicating the left-turning of the car; and a mirror-effect relay RL4 parallelly connected with each first contactor RL1/1, RL2/1, and RL3/1 of the backing relay RL1, right-turn relay RL2, and left-turn relay RL3 respectively, whereby upon actuation of each relay RL1 or RL2 or RL3, the mirror-effect relay RL4 will be actuated to drive the mirror-effect circuit 4 for reversing the scanning orientation for reliably showing a picture on the display means 7 having a same right-and left orientation with that of a true subject at a rear side of the car and to synchronously drive the sound-signal sensor 5 for sounding the sound signal as picked up by the microphone 51 of the sensor 5.

Each relay RL1, RL2 or RL3 may be connected in series with a test switch T1, T2 or T3 for a manual switching on for watching the picture as received by the display means 7.

By the way, a subject such as an arrow A as shown in FIG. 2 when focusing on the camera, its image Ai may change its direction. However, the inverting scanning of this invention from a right side to the left side will change the orientation of the picture Ap when reproduced on the display means 7 to have a same orientation of the true subject A to have a reliable showing of the position and orientation of a rear subject or object for enhancing a driving safety especially when backing or turning a car. The two sideview mirrors are also provided with right and left cameras CCD2, CCD3 for a broader rearview when driving the car or turning the car rightwardly or leftwardly.

In order for a clear observation of both a right or left side scene and a rear side scene on a unique television 7 when backing and turning the car rearwardly and sidewardly simultaneously, a further relay RL5 and a timing controller 61 such as a flip-flop RA and RB may be provided as shown in a right portion of FIG. 6, which, the system control circuit 6 includes: a simultaneously backing and turning relay RL5 connected in parallel with a second contactor RL2/2, RL3/2 of each right-turn relay RL2 and left-turn relay RL3, and connected in series with a second contactor RL1/2 of the backing relay RL1; the backing and turning relay RL5 normally closed to electrically and parallelly connect the rear, the right and the left video cameras CCD1, CCD2, CD3 respectively through each third contactor RL1/3, RL2/3, R13/3 of the backing relay RL1, the right-turn relay RL2 and the left-turn relay RL3; and the backing and turning relay RL5 operatively actuated when the backing relay RL1 and either the right-turn relay RL2 or the left-turn relay RL3 are simultaneously actuated to primarily operate the rear video camera CCD1 and then alternatively operate either the right video camera CCD2 or left video camera CCD3 upon the actuation of either the right-turn relay RL2 or the left-turn relay RL3 when a normally-open contactor RB/2 of a timing controller 61 is operatively closed by the timing controller 61 in a predetermined time interval, thereby alternatively switching on the rear camera CCD1 or the right camera CCD2 when the car is backed rearwardly and rightwardly; and alternatively switching on the rear camera CCD1 or the left camera CCD3 when the car is backed rearwardly and leftwardly, and thereby showing a picture of the subject either at the rear side or the right (or left) side of the car on the display means 7.

The timing controller 61 as shown in FIG. 6 may be a flip-flop, RA and RB, wherein when RA is on, RB is off, the contactor RB/2 of the flip-flop will be intermittently closed and opened to alternatively switch on or off the right camera CCD2 or the left camera CCD3 with respect to a switch-off or switch-on of the rear camera CCD1, A RC timing constant can be pre-set by the capacitor C1 and resistor R1 of RA of the flip-flop. In the circuit of the relay RL5 and timing controller 61, several diodes D0, D1, D2, D3, Da and Db are provided to allow a single-direction current flow in the relevant contactors for ensuring a reliable control of the system control circuit 6 of the present invention.

Other timing controllers may be modified in this invention. The present invention may be modified without departing from the spirit and scope of this invention.

The present invention provides a broader rearview and sideview for a car driver and also provides a true orientation of a picture display on the television in commensuration with the orientation of a true subject at a rear side of the car for enhancing traffic safey.

I claim:

1. A vehicle monitoring apparatus comprising:

a car (1) having a rear video camera (CCD1) mounted on a rear portion (11) of the car (1), a right video camera (CCD2) mounted in a right-sideview mirror (13) of the car (1), and a left video camera (CCD3) mounted in a left-sideview mirror (14) of the car (1);

a television receiver (3) including an audio and video receiving circuit (30), a deflection circuit (31) and a sounding circuit (32) for receiving video signals from said video cameras (CCD1, CCD2, CCD3) and for receiving audio signals from a sound-signal sensor (5) mounted on the car (1);

a display means (7) having a cathode ray tube (CRT) therein and mounted in the car (1);

a mirror-effect circuit (4) connected to the deflection circuit (31) of the television receiver (3) for inverting two poles (H1, H2) of a pair of horizontal deflection coils (Hc) of the deflection circuit (31) for changing a left to right scanning direction to a right to left scanning direction for reproducing a picture on the cathode ray tube (CRT) of the display means (7) in response to a true subject positioned at a rear side of the car (1), thereby reversing a right-and-left picture orientation from the left-to-right scanning direction to have right-and-left orientation of the picture shown on the display means (7) to be same as that of the true subject at the rear side of the car (1) for safely driving the car (1) when backing or turning the car (1); and a system control circuit (6) for controlling the actuation of the cameras (CCD1, CCD2, CCD3), the mirror-effect circuit (4) and the sound-signal sensor (5).

2. A vehicle monitoring apparatus according to claim 1, wherein said rear video camera (CCD1) is mounted on a wind deflector on a rear portion of the car (1).

3. A vehicle monitoring apparatus according to claim 1, wherein each said video camera includes: a camera of charge coupled device (CCD) electrically connected to a power source (P.S.), a housing (21) encasing the camera of charge coupled device in the housing (21), a light-transmissive shield (22) made of dark color having a flat surface and covering an outer portion of the housing (21) allowing optical focusing of an external subject positioned at a rear side of the car (1) into the camera for transmitting video signals (Vo) towards the display means (7), and an illuminator (23) mounted in the housing (21) for a visible sensing of the external, subject at night.

4. A vehicle monitoring apparatus according to claim 1, wherein said mirror-effect circuit (4) includes: a mirror-effect relay (RL4) including a first relay contactor (RL4/1) and a second relay contactor (RL4/2) reversely connected to a first and a second pole (H1, H2) of the horizontal deflection coils (Hc) connected to a horizontal deflection and oscillation circuit (HDO) of the television receiver (3) to operatively change a left-to-right scanning direction to a right-to-left scanning direction to thereby reverse the right-and-left picture orientation from the left-to-right scanning direction to have a right-and-left orientation of a picture shown on the display means (7) to be same as that of a true subject positioned at a rear side of the car (1) upon actuation of a third relay contactor (RL4/3) of the mirror-effect relay (RL4) when backing the car or turning the car rightwardly or leftwardly; the first pole (H1) of the horizontal deflection coils (Hc) normally connected to the horizontal deflection and oscillation circuit (HDO) of the television receiver 131, and the second pole (H2) of the horizontal deflection coils (Hc) normally grounded; said first relay contactor RL4/1) normally connected to the first pole (H1) of the horizontal deflection coils (Hc) and operatively grounded when the mirror-effect relay (RL4) is actuated to close the third relay contactor (RL4/3) of the mirror-effect relay (RL4) when backing the car or turning the car rightwardly or leftwardly; and the second relay contactor (RL4//2) normally connected to the horizontal deflection and oscillation coil (HDO) and operatively connected to the second pole (H2) of the horizontal deflection coils (Hc) when the mirror-effect relay (RL4) is actuated.

5. A vehicle monitoring apparatus according to claim 1, wherein said sound-signal sensor (5) includes: a microphone (51) mounted on an outer portion of the car (1) for picking up sound signals from a surrounding of the car (1) for inputting sound signals into the sounding circuit (32) of the television receiver (3) through a sounding-circuit contactor (RL4/4) of the mirror-effect relay (RL4), whereby upon actuation of the mirror-effect relay (RL4) to close the sounding circuit contactor (RL4/4), the sound signals from the television receiver (3) will be detected and amplified by the sounding circuit for sounding the sound signal through loudspeaker (SP).

6. A vehicle monitoring apparatus according to claim 1, wherein said system control circuit (6) includes: a backing relay (RL1) electrically connected in series with a car-backing switch (SW1) which is actuated when backing the car and connected with a car key switch (SWo) which is connected in between two poles of a power source (P.S.) and will be closed when inserting the car key into a key hole in the car for powering the system control circuit (6); a right-turn relay (RL2) electrically connected in series with a right-turn switch (SW2) which is actuated when turning the car rightwardly; a left-turn relay (RL3) electrically connected in series with a left-turn switch (SW3) which is actuated when turning the car leftwardly: and a mirror-effect relay (RL4) parallelly connected with each first contactor (RL1/1, RL2/1), and (RL3/1) of the backing relay (RL1), right-turn relay (RL2), and left-turn relay (RL3) respectively, whereby upon actuation of each of said relays, the mirror-effect relay (RL4) will be actuated to reverse the scanning direction of a picture reproduced on the display means (7) thereby reversing the right-and-left picture orientation from the left-to-right scanning direction to have a right-and-left orientation of the picture shown on the display means (7) to be same as that of the true subject at a rear side of the car and to synchronously drive the sound-signal sensor (5) for sounding the audio signals as picked up by a microphone (51) of the sensor (5).

7. A vehicle monitoring apparatus according to claim 6, wherein said system control circuit (6) includes: a simultaneously backing and turning relay (RL5) connected in parallel with each second contactor (RL2/2, RL3/2) of the right-turn relay (RL2) and left-turn relay (RL3), and connected in series with a second contactor (RL1/2) of the backing relay (RL1); the backing and turning relay (RL5) normally closed to electrically parallelly connect the rear, the right and the left video cameras (CCD1, CCD2, CCD3) respectively through each third contactor (RL1/3, RL2/3, RL3/3) of the backing relay (RL1), the right-turn relay (RL2) and the left-turn relay (RL3); and the backing and turning relay (RL5) operatively actuated when the backing relay (RL1) and either the right-turn relay (RL2) or the left-turn relay (RL3) are simultaneously actuated to operate the rear video camera (CCD1) and then alternatively operate either the right video camera (CCD2) or left video camera (CCD3) upon the actuation of either the right-turn relay (RL2) or the left-turn relay (RL3) when a normally-open contactor (RB/2) of a timing controller (61) is operatively closed by the timing controller (61) in a pre-determined time interval.

8. A vehicle monitoring apparatus according to claim 7, wherein the timing controller (61) is a flip-flop and the contactor (RB/2) of the flip-flop is intermittently closed and opened to alternatively switch on or off the right camera (CCD2) or the left camera (CCD3) with respect to a switch-off or switch-on of the rear camera (CCD1).

* * * * *